(12) United States Patent
Nyce et al.

(10) Patent No.: US 8,692,541 B2
(45) Date of Patent: Apr. 8, 2014

(54) POSITION SENSING HEAD WITH REDUNDANCY

(76) Inventors: David Scott Nyce, Apex, NC (US); Leonard Hillel Goldman, Merion Station, PA (US)

( * ) Notice: Subject to any disclaimer, the term of this patent is extended or adjusted under 35 U.S.C. 154(b) by 226 days.

(21) Appl. No.: 13/253,192

(22) Filed: Oct. 5, 2011

(65) Prior Publication Data

US 2013/0088243 A1 Apr. 11, 2013

(51) Int. Cl.
*G01B 7/14* (2006.01)

(52) U.S. Cl.
USPC ............ 324/207.16; 324/207.13; 324/207.15; 324/207.11

(58) Field of Classification Search
USPC ........................................ 324/207.16, 207.24
See application file for complete search history.

(56) References Cited

U.S. PATENT DOCUMENTS

| | | | | |
|---|---|---|---|---|
| 3,891,918 A | * | 6/1975 | Ellis | 324/207.16 |
| 4,634,126 A | * | 1/1987 | Kimura | 273/129 S |
| 4,737,705 A | * | 4/1988 | Bitar et al. | 324/635 |
| 5,508,662 A | * | 4/1996 | Guichard et al. | 331/65 |
| 5,619,133 A | * | 4/1997 | Shank et al. | 324/207.24 |
| 5,652,510 A | * | 7/1997 | Kyodo | 324/207.16 |
| 6,191,575 B1 | * | 2/2001 | Mednikov et al. | 324/207.16 |
| 7,046,018 B2 | * | 5/2006 | Toda et al. | 324/679 |
| 7,216,054 B1 | * | 5/2007 | Pchelnikov et al. | 702/150 |
| 7,528,597 B2 | * | 5/2009 | Taylor et al. | 324/207.15 |
| 7,602,175 B2 | * | 10/2009 | Mednikov et al. | 324/207.16 |
| 2008/0290861 A1 | * | 11/2008 | Niwa et al. | 324/207.16 |

* cited by examiner

*Primary Examiner* — Richard Isla Rodas (57) ABSTRACT

A position sensing head combines a sensing element and a simplified electronic module to enable operation with one wire, in addition to a circuit common, for providing power and transmitting a signal, while separating the sensing head from signal conditioning circuits by over 10 meters. The simplicity of the electronic module allows the use of basic electronic components that operate at more than 225° C. The signal is a variable frequency impressed onto the one wire, which can be read by a frequency meter. Another signal, such as a position or temperature, can be impressed onto the one wire at the same time as the first signal. The second signal is of a different frequency range so that it will not interfere with the first. A demodulator circuit can separate the two signals. The sensing element construction allows for locating up to three active elements measuring the same target.

4 Claims, 7 Drawing Sheets

POSITION SENSING HEAD WITH REDUNDANCY

BACKGROUND OF THE INVENTION

1. Field of the Invention

The present invention relates to sensors that utilize a sensing element and electronic circuits in performing a sensing function to measure the value of a physical parameter, such as linear or rotary position, and that provide an electrical output indicative of the value of the measured parameter. Further, the present invention relates to sensors operating in an environment in which it is desirable to avoid the use of ferromagnetic materials, to minimize the physical size of the sensor, or in which a high temperature or other harsh environmental condition, such as ionizing radiation, may exist. Still further, the present invention also relates to high reliability measurements in which multiple sensors may be deployed in order to provide redundant measurements, or to sensor installations in which it is desired to connect a minimum number of wires to the sensor.

2. Description of the Prior Art

Prior Art sensors, such as Linear Variable Differential Transformers (LVDTs), and magnetostrictive position sensors, typically utilize a sensing element and an electronics module. The electronics module powers the sensing element, conditions the signal provided from the sensing element, and provides a desired output signal. The signal conditioning part of the electronics module is designed specifically to provide the type of power and to receive the type of signal provided by the sensing element. The included analog and/or digital circuits for powering and signal conditioning are generally somewhat complex, and the required specialized components are difficult or impossible to find on the market with maximum temperature capability of more than 125° C.

Prior Art sensors can sometimes be physically partitioned into a sensing part, and a signal conditioning part, so that the sensing part can be exposed to a higher temperature (or sometimes, to radiation), and the signal conditioning part can remain at a lower temperature (or, at a lower radiation level). For example, an LVDT can be separated from the signal conditioner, and connected therewith by three to six power and signal wires, allowing the LVDT to be located in a higher temperature area. But the connecting wires carry sinusoidal and quadrature sinusoidal waveforms at kilohertz (kHz) frequencies, and sometimes at relatively low voltage levels, while the amplitude of the voltage, as well as the phase, represents the signal. So, the connections must be made using a shielded cable, and must be used with a signal conditioner that is designed for that type of LVDT, and that is calibrated for exactly that particular LVDT.

With a magnetostrictive linear position sensor, as another Prior Art example, the sensing head can be separated from the conditioning electronics by a very short cable having wires for the interrogation pulse and wires for the received signal pulse. But the interrogation wires must carry current in the range of more than ten volts and more than one ampere, while the signal wires carry a signal in the millivolt and micro amp range. This places limitations on the length (a few inches) and type of cable (individually shielded pairs), and requires a specialized electronics module that is designed for the type of sensing element and that is calibrated for exactly that particular magnetostrictive sensor. Many Prior Art sensors include magnetic materials, such as iron and nickel, and permanent magnets, which are sometimes not compatible with requirements of a specific application. An LVDT uses a core made from a ferromagnetic material (usually a nickel-iron alloy), and magnetostrictive position sensors utilize a position magnet which is a permanent magnet, often a rare-earth magnet.

In Prior Art high reliability applications, multiple identical sensors have often been deployed to make one measurement. With two sensors (a dual-redundant system), as long as the two sensors agree, then the data are expected to be accurate. If the two sensors are reporting different readings, then the data from both sensors are suspect, and should not be relied upon. With three sensors (a triple-redundant system), as long as at least two of the sensors agree, then the system can continue to operate with this value until a convenient time for service and replacement of the one sensor that disagrees. Dual and triple-redundant sensor systems have been deployed in the Prior Art by installing two or three separate sensors, and then mechanically coupling each of them to the same movable object, so that they each measure the position of the movable object. This mechanical coupling introduces errors due to differences in alignment, free-play, and other imperfect attributes of the mechanical couplings.

In U.S. Pat. No. 4,637,265, a non-contact sensor apparatus uses the combination of a stationary coil and a movable coil, connected into stationary and movable tank circuits, which are inductively coupled to produce a double resonance curve in the stationary tank circuit. But, having a movable coil and electronics assembly, this arrangement is not suitable for separation of the sensing element from the electronics module.

In U.S. Pat. No. 7,216,054, a non-contact position sensor is taught that can be fabricated at low cost and with high reliability. According to that invention, multiple sensors would still be deployed in the case where redundant measurements are needed, but instead, the present invention can be applied to such a sensor, and thereby all of the advantages of the present invention would be added.

SUMMARY OF THE INVENTION

The present invention teaches a sensing head having several improvements to Prior Art electromagnetic-type position sensors that employ a sensing element configured as a section of a coupled slow-wave structure, used as a resonator, and coupled with an electrically conductive movable target, such as that in U.S. Pat. No. 7,216,054. Accordingly, the term "sensing element" is descriptive of the purpose of such a device, while the term "resonator" is descriptive of its electrical function, and therefore these two terms are sometimes used here interchangeably. The present invention teaches three improvements over the prior art:

1. A sensing head is formed of a sensing element and a simplified electronics module, the simplified electronics module including a resonant oscillator, a resonant oscillator being an oscillator having a frequency controllable by a resonator that is connected to it. Accordingly, the terms "oscillator" and "resonant oscillator" are sometimes used here interchangeably. The sensing element is thereby separated from the complex electronic circuitry that would otherwise be needed to provide an output that is a standard type for a sensor. Electronic circuits, except for a very simple resonant oscillator circuit co-located with the sensing element, are removed, and the sensing head has a variable frequency output signal instead. The combination of the sensing element and the resonant oscillator circuit, mounted into a much smaller housing, is called the sensing head. The simplicity of the resonant circuit allows high temperature operation, because the simple components used can be found on the market with operating temperatures of 225° C., or more. The amplitude of the variable frequency output is not indicative of the signal, and so there is no degradation of the accuracy of the signal, even with a separation distance of more than 10 meters between the sensing head and a receiving device. Use of the simple resonant oscillator circuit in the sensor head, rather than the use of normal signal conditioning electronics, allows the simplified electronics module to be very small. As a result, the usual diameter of about 1.90 inches for a Prior Art position sensor having a single circuit board can be reduced to less than 0.80 inches, still having a single circuit board.

Use of the simplified electronics module also enables the sourcing of components that can operate in environments of higher levels of ionizing radiation.

2. The sensing element of the sensing head is constructed so that up to three active elements (i.e. resonators) can be located within the same physical space as a single sensor. For a dual sensing head, the two parts (resonators) of the sensing element can be positioned coaxially, or linearly, with respect to one another. For a triple sensing head, two resonators of the sensing element are positioned linearly, and the third resonator is mounted coaxially. In both cases, they all measure the position of the same movable object.

3. The sensing head is connected with receiving or conditioning equipment by only one wire, in addition to the usual chassis ground, common, or shield. The power and signal are both communicated over the one wire. The signal is a variable frequency that is impressed onto the one wire. The amplitude of the signal frequency is not important, as long as the signal is detectable. The position, or the position and a temperature, or two positions, or two positions and a temperature, etc. can be impressed onto the one wire at the same time by frequency division multiplexing (FDM). Each of the signals to be impressed by FDM has its own individual frequency range of operation, so the multiple FDM signals can be separated again as needed, by filtering over the respective frequency ranges. A demodulator circuit is also shown, as an example for separation of the FDM signals at the receiving end of a sensor system.

With only the sensing function contained within the sensing head, the external circuitry that is used for signal conditioning and/or analysis can be made with a standardized calibration setting. Therefore, the signal conditioning and/or analysis equipment can be changed if desired, without affecting the calibration of the sensor.

BRIEF DESCRIPTION OF THE DRAWINGS

For further understanding of the nature and objects of the present invention, reference is made to the following figures in which like parts are given like reference numerals and wherein.

DETAILED DESCRIPTION OF THE INVENTION

In order to implement the first improvement of the invention, which is a sensing head, a simplified circuit is designed so that, if desired, only basic electronic components of the type that are easily found on the market with operating temperatures of 225° C. and higher may be used. The simplified circuit includes an oscillator coupled with a sensing element. The sensing element can be of a new design, or one that is already known in the art. The sensing element and oscillator provide a frequency that is representative of a measured position. The simplified circuit also includes a buffer to output the signal frequency. The combination of one or more oscillators and one or more buffers comprises the simplified electronic module.

Figure 1:
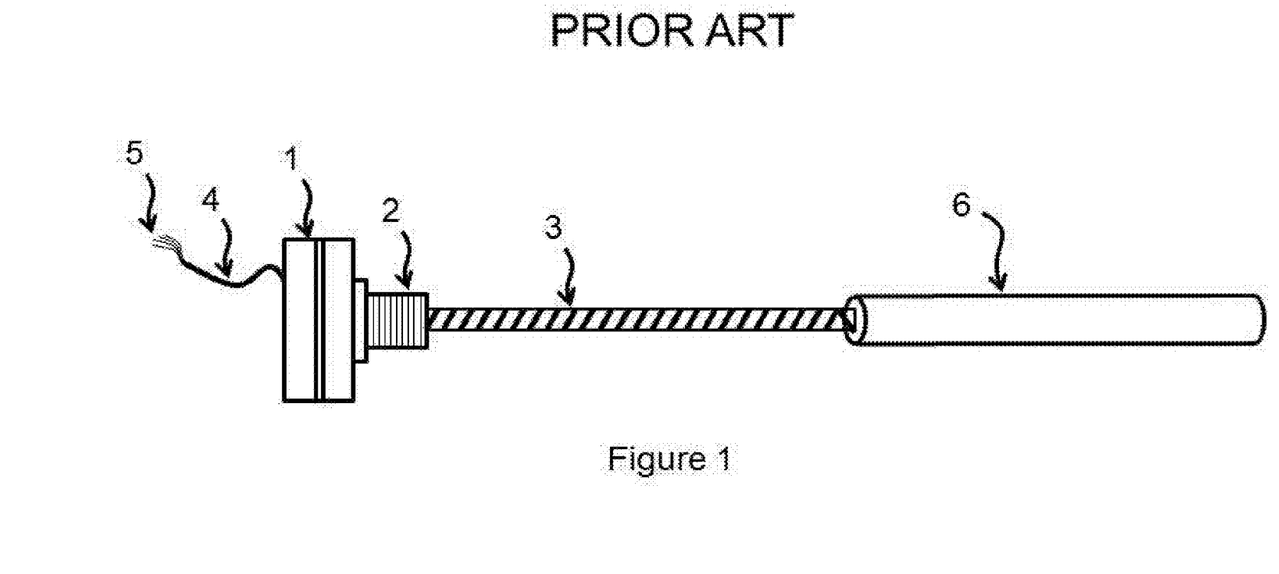
FIG. 1 is a Prior Art linear position sensor, in accordance with U.S. Pat. No. 7,216,054.

FIG. 1 is a Prior Art electromagnetic linear position sensor in accordance with U.S. Pat. No. 7,216,054. The housing (1) encloses an electronics module (not shown), which is usually manufactured as a printed circuit board having electronics components mounted to its surfaces. Threaded area (2) provides means for mounting the position sensor into a desired location. Sensing element (3) is constructed of an electrically-insulative rod onto which are wound inner and outer helices of electrically conductive material (but only the outer helix can be seen in the drawing). The two helices are arranged along the electrically-insulative rod at a pitch, with a separating material to electrically insulate one helix from the other. The electrodynamic element thus formed is a part of a slow wave structure. Cable (4) brings out electrical connections from the electronics module that is within housing (1), and contains, for example, four connection wires (5). In the example of four connection wires, they can be power, common, output voltage or current, and calibration port, for example. Target tube (6) is formed of an electrically conductive material, such as an aluminum alloy, and is moveable over sensing element (3). As target tube (6) moves toward threaded area (2) it covers up more and more of the length of sensing element (3). For example, target tube (6) is shown in FIG. 1 at zero percent coverage of sensing element (3), and will cover it by 100% when target tube (6) moves to be adjacent to threaded area (2). This movable range of 0 to 100% is the measuring range of the position sensor.

The Prior Art sensing element (3) of FIG. 1 must be coupled with an electronics module in order to operate as a position sensor. The various functions that are included within a typical electronics module in order to operate as a position sensor, such as the position sensor of FIG. 1, are shown in the block diagram of Prior Art FIG. 2. Power conditioning circuits (21) ensure that transient voltages (such as electrostatic discharge) or reversed connections will not damage the circuitry. Power conditioning circuits (21) also include a voltage regulator and a voltage inverter to provide proper voltages to various parts of the electronics module. A typical regulated voltage is 3.3 VDC (volts, direct current). The inverter supplies a slightly negative voltage (e.g. about −1.0 VDC) so that the output amplifier of output section (24) can fully go down to 0.00 VDC when desired, with a position sensor having a voltage output. Optionally, the output can be digital format, with sufficient number of connection wires to support the chosen format.

Figure 2:
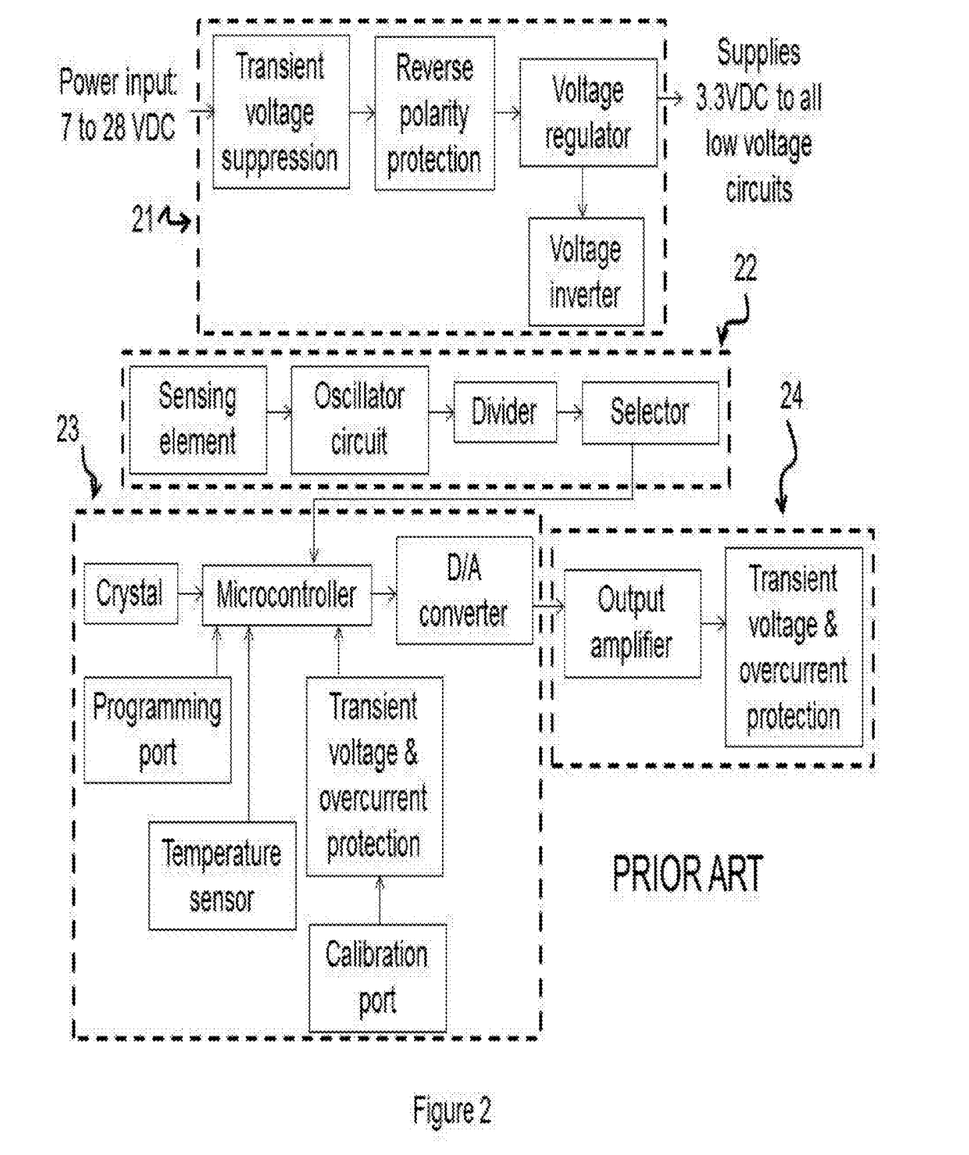
FIG. 2 is a representative block diagram of a Prior Art electronics module that is normally utilized within the linear position sensor of FIG. 1.

Sensing section (22) includes a connection for the sensing element, an oscillator coupled with the sensing element, a divider, and a selector. The sensing element can be similar to that shown in FIG. 1. The oscillator oscillates at a frequency that is indicative of the percentage of the measuring range of sensing element (3) that is covered by target tube (6). Since the oscillator frequency may be in the megahertz (MHz) region, a divider is used to increase the period for easier measurement. The selector allows the selection of an appropriate number of stages of division. Control section (23) includes a microcontroller that receives the frequency signal, selects the division amount, receives temperature information, and sends calibrated digital information to a digital to analog (D/A) converter. A programming port connects with the microcontroller for loading of its operating firmware, and a calibration port is also connected for calibration in order to provide the desired scaling of the output.

Output section (24) receives an analog output from the D/A converter and produces the output voltage or current. Output section (24) also includes protection of the output circuit from damage due to transient voltages or overcurrent.

Figure 3:
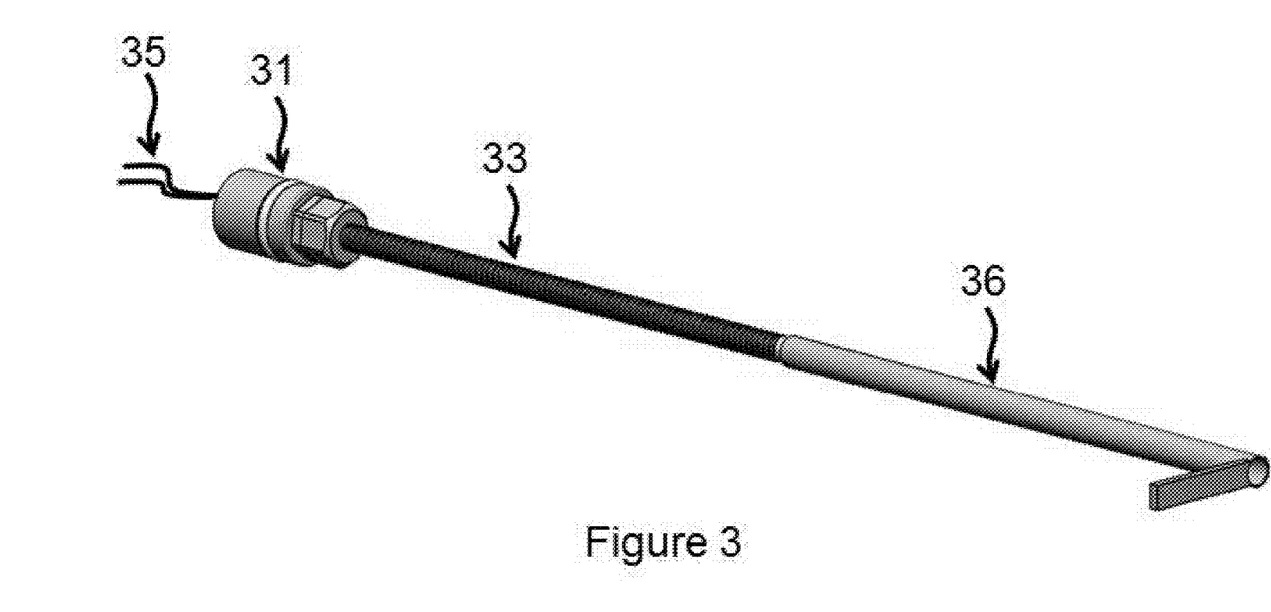
FIG. 3 is a single measuring sensing head according to the present invention.

A single sensing head according to the present invention is shown in FIG. 3. Sensing element (33) and target tube (36) are constructed similarly to those of Prior Art. Sensing element (33) is coupled with smaller housing (31), which encloses a simplified electronics module (not shown in this view). A pair of wires (35) is depicted for electrical connections that will provide power, and will also support signal transmission in a preferred embodiment of the present invention. One wire of the pair is the power wire, and the other conductor is a power return conductive path, such as circuit common or case connection. The power return or case connection is not required to be a separate wire, but may be connected directly through contact with housing (31).

The sensing head (FIG. 3) includes a simplified electronics module that is mounted within housing (31). The simplified electronics module is typically manufactured as a single printed circuit board with electronic components mounted onto its surfaces. The simplified electronics module functions are shown in the block diagram of FIG. 4.

Figure 4:
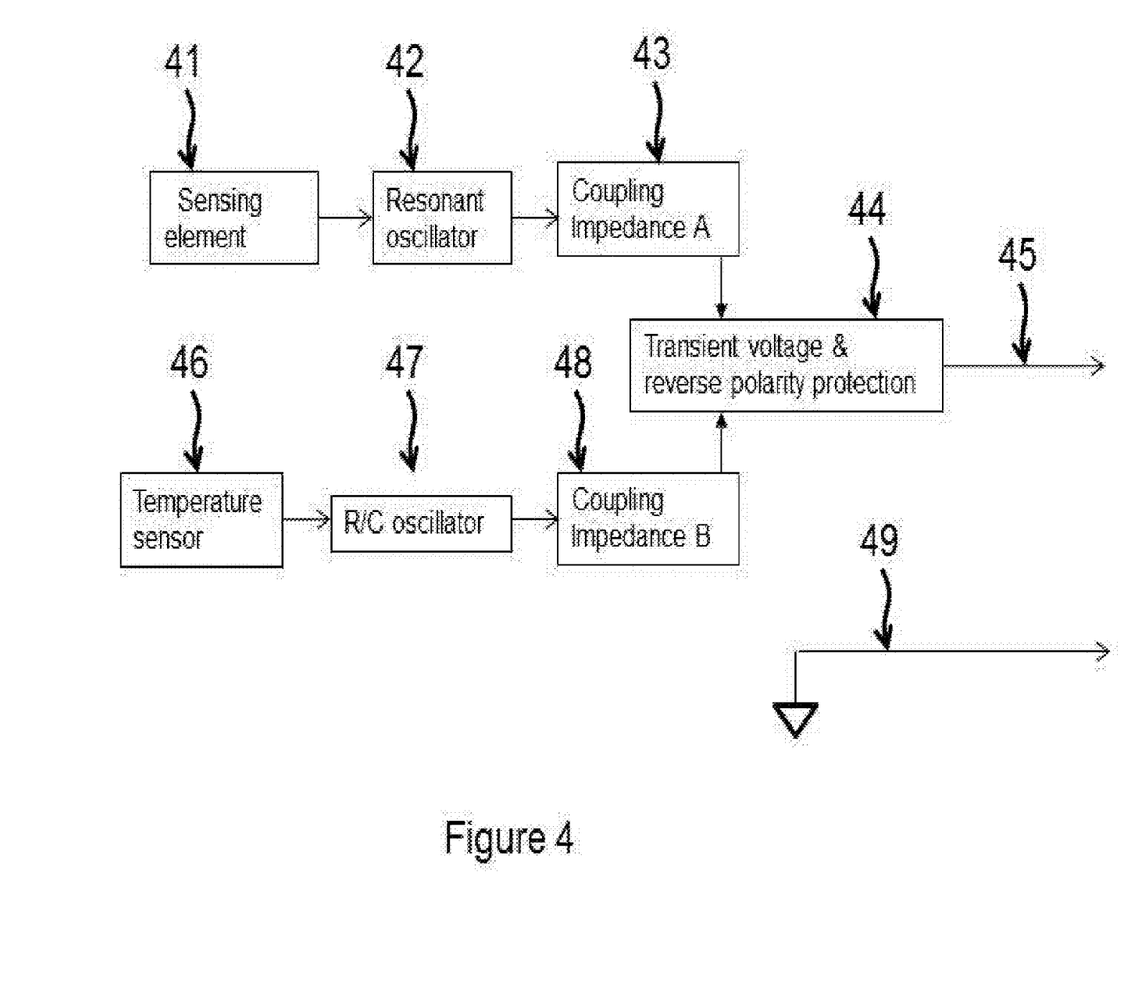
FIG. 4 is a representative block diagram, according to the present invention, of a simplified electronics module that is mounted within the sensing head of FIG. 3, and also shows sensing element (41) coupled with resonant oscillator (42).

Sensing element (41) and resonant oscillator (42) oscillate at the resonant frequency of sensing element (41), the frequency depending on the value of a measured position. This position frequency is coupled with the one wire (45) by coupling impedance A (43). Power is provided to the circuit through one wire (45), along with power return wire (49), while circuit protection is provided by transient voltage and reverse polarity protection (44). R/C oscillator (47) oscillates at a frequency depending on the temperature measured by temperature sensor (46). This temperature frequency is coupled to the one wire (45) by coupling impedance B (48).

Figure 5:
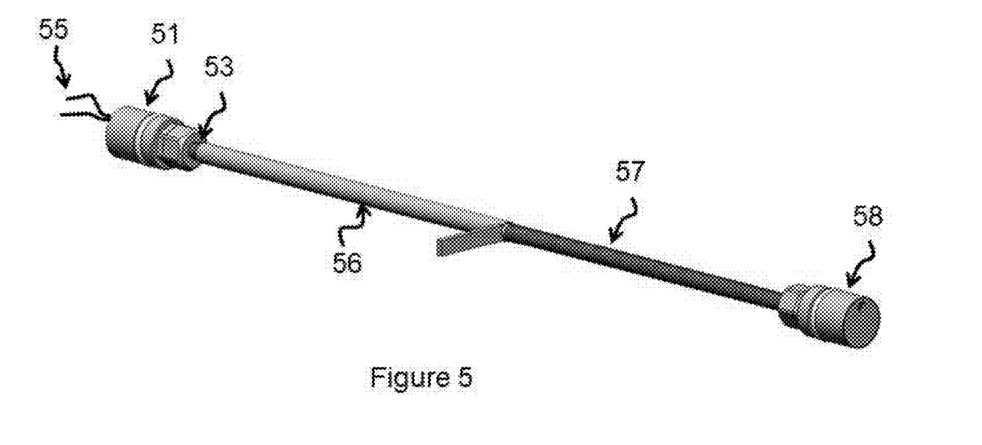
FIG. 5 is a dual-redundant measuring sensing head according to the present invention.

The second improvement of the invention is a sensing head that implements two or three position-sensing sets of helices (each set of helices in the sensing element forming a resonator), and one target, in the same physical space as a single set of helices and a target. A sensing head having two sets of helices can be said to have two channels of measurement, and can provide dual-redundant measurement of the same position. FIG. 5 shows two sets of helices aligned linearly (or, in-line) with one-another. But alternatively, the two sets of helices can be aligned concentrically, with one helix surrounding the other, and the target tube moving in the annular space between them, as will be shown for the third channel of FIG. 6.

In the two channel version of FIG. 5, a first simplified electronics module is located within housing (51), and a second simplified electronics module is located within housing (58). Wires connecting with the second simplified electronics module (58) can exit from the right side of housing (58), or alternatively, can be brought back through a hollow sensing element (i.e., the helices wound onto a tube) if small diameter magnet wire is used as the connecting wires. Or, both of the two simplified electronics modules can be located at one end, with the small diameter magnet wire running through a tubular sensing element and coupling the second simplified electronics module with the second set of helices. As shown in FIG. 5, the target tube (56) position is near 100% coverage of the first set of helices (53), toward the left, and near 0% coverage of the helices of the second set of helices (57). If target tube (56) is moved to the right, then helices (57) will continue to increase being covered toward 100%, as helices (53) will continue to be uncovered toward 0%.

Figure 6:
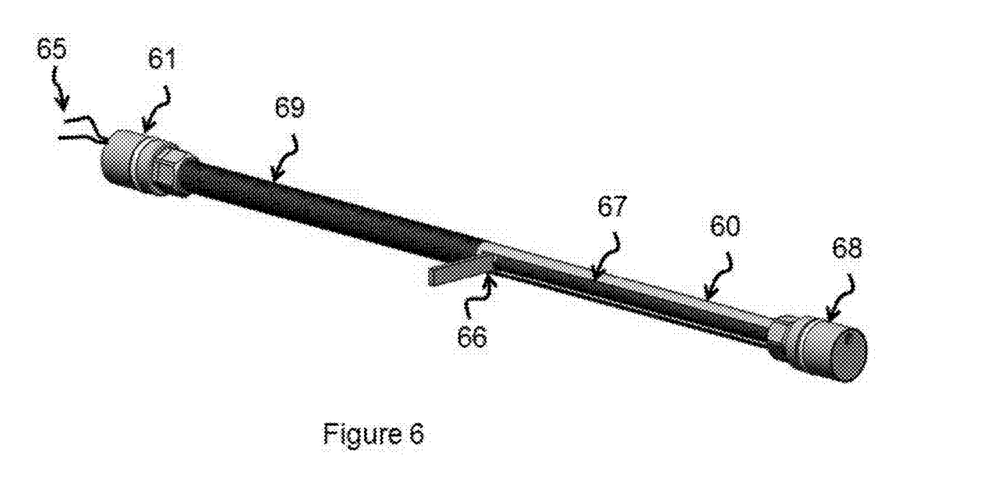
FIG. 6 is a triple-redundant measuring sensing head according to the present invention.

FIG. 6 shows a three channel version of the invention, having three sets of helices and three simplified electronics modules. As described for the two channel version of FIG. 5, any of the three simplified electronics modules can be located within one or both of the first housing (61) or the second housing (68). The first set of helices cannot be seen in FIG. 6, because it is located concentrically within the third set of helices (69). The second set of helices (67) is positioned in-line with the first set of helices. Target tube (66) covers more or less of the second and first sets of helices as it is moved from left to right, as explained for FIG. 5. Target tube (66) moves in an annular space in-between the first set of helices (not visible in FIG. 6) and the third set of helices (69).

Figure 7:
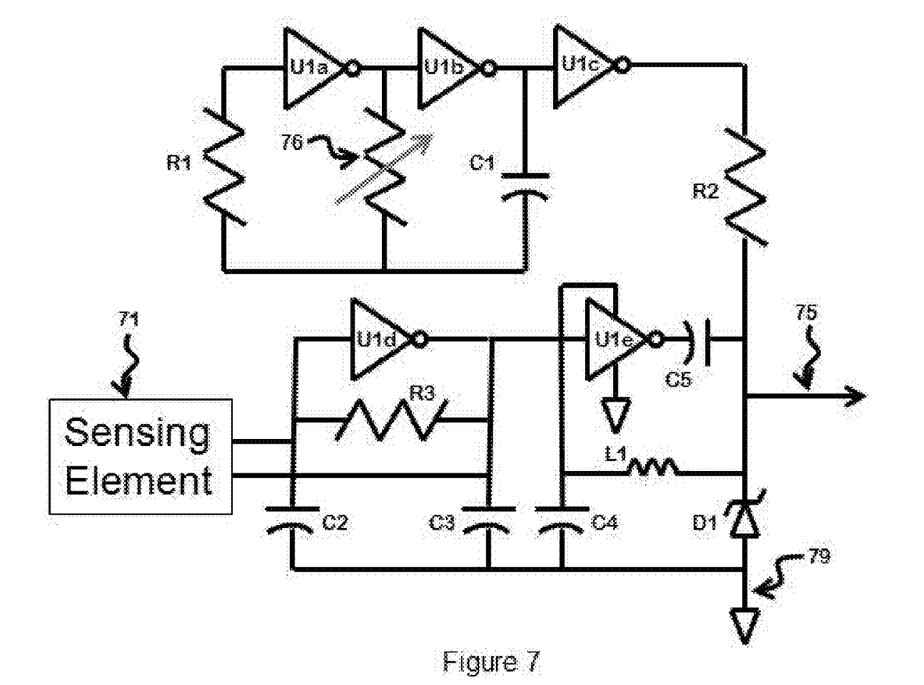
FIG. 7 is the schematic diagram of a simplified electronics module for measuring one position and one temperature, also showing sensing element (71) coupled with a resonant oscillator comprising U1d, R3, and C2, C3.

An example of the simplified electronics module of the present invention was shown as a block diagram in FIG. 4, so that it could be compared with a typical Prior Art position sensor electronics module as shown in FIG. 2. FIG. 7 is a circuit diagram of a typical simplified electronics module of the present invention, with an oscillator circuit being coupled with sensing element (71). U1 is a typical CMOS inverter, usually available with six of them within one standard integrated circuit package. This circuit uses five of them, U1a through U1e. U1a and U1b, together with resistor R1, capacitor C1, and thermistor (76), form an oscillator, with a frequency determined mostly by the values of C1 and thermistor (76). The value of a given C1 remains constant. The resistance value of thermistor (76) changes with changes in its temperature. So, the frequency available at the oscillator output (at the right side of U1b), represents the measured temperature. U1c buffers the oscillator output, and provides it to an impedance (R2, in this case), that couples the frequency of the measured temperature to the one-wire connection, (75).

U1d, together with resistor R3, capacitors C2 and C3, form an oscillator, with a frequency determined mostly by the values of C2, C3 and sensing element (71) that is connected with the oscillator.

The values of a givin set of C1 and C2 capacitors remain constant. The resonant frequency of sensing element (71) changes with changes in a measured position. So, the frequency available at the oscillator output (at the right side of U1d), represents the measured position. U1e buffers the oscillator output, and provides it to an impedance (C5, in this case), that couples the frequency of the measured position to the one wire (75).

Power is supplied to all of the circuit through the one wire (75), with power return (79) being used to complete the circuit. Zener diode (D1) protects against reverse-connection, and also protects against over voltage and electrostatic discharge. Inductor L1 provides an impedance between the one wire (75) and the power supply for the circuit (at the top of C4), so that the temperature and position frequencies can be impressed upon the one wire (75) without also appearing on the power supply voltage for the circuit, at the top of C4.

Capacitor C4 filters the power supply for the circuit, working with inductor L1, so that the circuit has a steady supply voltage at the top of C4.

For dual and triple redundant versions, the circuit functions comprising U1d, U1e, Resistor R3, Capacitors C2, C3, and impedance, in this case, C5, would be duplicated and coupled with the respective helices of the respective sensing element. Diode D1, inductor L1, and capacitor C4, do not need to be duplicated in those cases.

Figure 8:
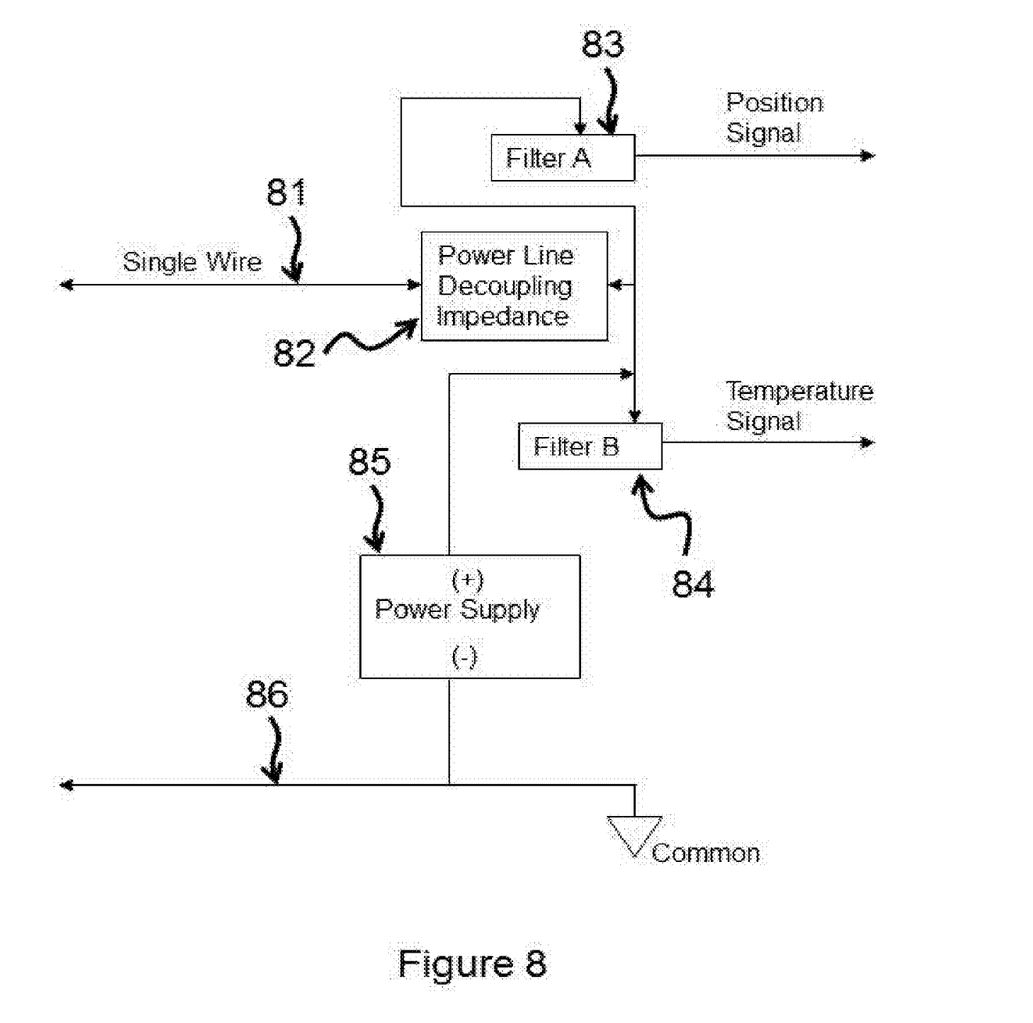
FIG. 8 is a representative block diagram of a demodulator for separating two FDM signals.

In utilizing a sensing head according to the present invention, for example, a single channel version, one may utilize a circuit such as represented in block diagram in FIG. 8, to supply power to the simplified electronics module contained within the sensing head, and to separate the position and temperature signals, for example. The one wire (81) would bring power to the sensor head, and receive the FDM signals. Power return connection (86) is used to complete the circuit. Power line decoupling impedance (82) allows power to be supplied to the simplified electronics module, while having sufficient impedance at the temperature measurement and position measurement frequencies so that those frequencies can also be present. Power line coupling impedance can be an inductor. Power supply (85) supplies the power, usually approximately 3.3 VDC. Filter A (83) is tuned to pass the frequency range of the position measurement frequency, and to reject other frequencies. It may be a high pass, low pass, or band pass filter, as are known in the art.

Filter B (84) is tuned to pass the frequency range of the temperature measurement frequency, and to reject other frequencies. It may be a low pass, high pass, or band pass filter, as are known in the art. When there are more than one position measuring channels, additional filters can be employed.

We claim:

1. A sensing head for measuring a position and producing an output, the output indicative of the measured position, the sensing head comprising:
    a sensing element connected with an electronic circuit, the sensing element having a length, at least one resonator disposed along at least a part of the sensing element length, the resonator having a resonant frequency, the resonant frequency having a value, the resonator being formed of a conductor pattern having a pitch and a spacing, the pitch and spacing at least partially controlling the value of the resonant frequency, the electronic circuit comprising at least an oscillator and a buffer, wherein the resonator is an integral part of the oscillator, the sensing element coupled to the oscillator, the oscillator coupled to the buffer,
    an electrodynamic target being made of an electrically conductive material, the target movable along a motion axis that is approximately parallel with or perpendicular to the sensing element length, relative alignment between the target and the sensing element affecting the resonant frequency, the output having an output frequency, the output frequency having a value, the value of the output frequency being substantially the same as the value of the resonant frequency, the sensing head receiving power from a power source, the power being received from the power source over one wire and one power return conductive path, at least one output frequency being measurable on the one wire.

2. A sensing head according to claim 1, the sensing element having two resonators being disposed linearly as a first resonator and a second resonator, the first resonator having a first resonant frequency and the second resonator having a second resonant frequency, relative alignment between the target and the sensing element affecting both the first and second resonant frequencies.

3. A sensing head according to claim 1, the sensing element having two resonators being disposed coaxially as an inner resonator and an outer resonator, the inner resonator having an inner resonant frequency and the outer resonator having an outer resonant frequency, relative alignment between the target and the sensing element affecting both the inner and outer resonant frequencies.

4. A sensing head according to claim 1, the sensing element having three resonators, a first resonator and a second resonator being disposed linearly, an outer resonator being disposed coaxially with either the first or second resonator, the first resonator having a first resonant frequency, the second resonator having a second resonant frequency, the outer resonator having an outer resonant frequency, relative alignment between the target and the sensing element affecting all three of the first, second, and outer resonant frequencies.

* * * * *